United States Patent
Hsieh et al.

(10) Patent No.: US 8,031,446 B2
(45) Date of Patent: Oct. 4, 2011

(54) METHOD OF DETECTING OUTPUT PHASE LOSS FOR MOTOR DRIVER

(75) Inventors: Ting-Chung Hsieh, Taoyuan Shien (TW); Shih-Chieh Liao, Taoyuan Shien (TW); Jen-Hsiang Huang, Taoyuan Shien (TW); Lung-Jay Cheng, Taoyuan Shien (TW)

(73) Assignee: Delta Electronics, Inc., Taoyuan (TW)

( * ) Notice: Subject to any disclaimer, the term of this patent is extended or adjusted under 35 U.S.C. 154(b) by 613 days.

(21) Appl. No.: 12/200,073

(22) Filed: Aug. 28, 2008

(65) Prior Publication Data

US 2010/0052589 A1   Mar. 4, 2010

(51) Int. Cl.
*H02H 7/08* (2006.01)
*H02H 7/10* (2006.01)

(52) U.S. Cl. ........... 361/23; 361/31; 361/93.1; 318/798; 318/806; 324/521; 324/76.77

(58) Field of Classification Search .......... 318/778, 318/798, 812, 782, 806; 361/23, 30, 31, 361/29, 76, 88, 93.1, 93.9, 94; 324/76.52, 324/76.77, 521, 772

See application file for complete search history.

(56) References Cited

U.S. PATENT DOCUMENTS

| | | | | | |
|---|---|---|---|---|---|
| 4,354,216 | A | * | 10/1982 | Volta | 361/92 |
| 4,384,243 | A | * | 5/1983 | Muskovac | 318/729 |
| 4,461,986 | A | * | 7/1984 | Maynard et al. | 318/728 |
| 4,544,982 | A | * | 10/1985 | Boothman et al. | 361/96 |
| 4,683,513 | A | * | 7/1987 | Miller | 361/76 |
| 4,802,053 | A | * | 1/1989 | Wojtak et al. | 361/85 |
| 4,823,226 | A | * | 4/1989 | Reed et al. | 361/85 |
| 4,912,390 | A | * | 3/1990 | Curran et al. | 318/812 |
| 5,057,962 | A | * | 10/1991 | Alley et al. | 361/24 |
| 5,270,640 | A | * | 12/1993 | Kohler et al. | 324/765.01 |
| 5,506,743 | A | * | 4/1996 | Phillips | 361/85 |
| 5,565,753 | A | * | 10/1996 | Chen et al. | 318/809 |
| 5,570,258 | A | * | 10/1996 | Manning | 361/85 |
| 6,720,749 | B2 | * | 4/2004 | Ta et al. | 318/434 |
| 7,161,375 | B2 | | 1/2007 | Ho | |
| 7,167,348 | B2 | * | 1/2007 | Knox et al. | 361/23 |

* cited by examiner

*Primary Examiner* — Eduardo Colon Santana

(74) *Attorney, Agent, or Firm* — Chun-Ming Shih; HDLS IPR Services

(57) ABSTRACT

A method of detecting an output phase loss (OPHL) for a motor drive detects an abnormal OPHL operation when at least one phase of a three-phase current is continually zero. Each phase of the three-phase current is acquired, sampled, filtered, and compared. Hence, a corresponding zero-current counter value is continually added, and a corresponding abnormal current value is set as logic 1 when a zero-phase current of the three-phase current is continually zero. Finally, an OPHL certified value is set as logic 1 to confirm that the motor driver is operated in the abnormal OPHL operation. Therefore, a direct-current and an alternating-current OPHL can be detected before and after the motor driver is operated, respectively.

15 Claims, 4 Drawing Sheets

METHOD OF DETECTING OUTPUT PHASE LOSS FOR MOTOR DRIVER

BACKGROUND OF THE INVENTION

1. Field of the Invention

The present invention relates to a method of detecting a phase loss, and more particularly to a method of detecting an output phase loss (OPHL) for a motor driver.

2. Description of Prior Art

An output phase loss (OPHL) detection for a motor driving system is an important task when the motor is operated under the phase loss condition to produce high current and damage probably coils of the motor because of poor contact of the circuit.

The U.S. Pat. No. 7,161,375 disclosed "Phase-loss detection for rotating field machine" where current of the rotating field machine is calculated and sensed before the machine is started to confirm whether the machine is operated under an phase-loss condition or not. However, there are disadvantages to the disclosed technology, as following:

1. The current vector has to be controlled accurately in a specific direction by a closed-loop control. Hence, the disclosed technology is not applicable to the motor without the closed-loop control.

2. The phase-loss detection is executed before the motor is started and is not executed after the motor is started.

It is to be understood that both the foregoing general description and the following detailed description are exemplary, and are intended to provide further explanation of the invention as claimed. Other advantages and features of the invention will be apparent from the following description, drawings and claims.

SUMMARY OF THE INVENTION

Accordingly, a primary object of the present invention is to provide a method of detecting an output phase loss (OPHL) for a motor driver to detect and confirm that the motor driver is operated in the abnormal OPHL operation. Therefore, a direct-current and an alternating-current OPHL can be detected before and after the motor driver is operated, respectively.

In order to achieve the objective mentioned above, the method of detecting the direct-current/alternating-current OPHL for the motor drive is executed by an OPHL detection module. The OPHL detection module is implemented via firmware. The OPHL detection module comprises a first logic operation unit, a second logic operation unit, a sample-and-hold operation unit, a low-pass filter operation unit, a first comparison operation unit, an OPHL detection logic unit, an accumulation operation unit, a second comparison operation unit, and a third logic operation unit.

The first logic operation unit receives an OPHL certified value outputted from the third logic operation unit, and the second logic operation unit receives an external enable bit. The external enable bit and an output of the first logic operation unit are the inputs of the second logic operation unit, and a control bit is produced by the second logic operation unit. The sample-and-hold operation unit receives the digital three-phase current from the analog-to-digital converter unit and the control bit is provided to control whether the sample-and-hold operation unit connects the digital three-phase current or not. The sample-and-hold operation unit receives the digital three-phase current and the three-phase current is sampled and held by the sample-and-hold operation unit. The low-pass filter operation unit is connected to the sample-and-hold operation unit to filter high-frequency component of each phase of the sampled three-phase current. The first comparison operation unit is connected to the low-pass filter operation unit and receives a zero-current threshold value. The zero-current threshold value is compared with each phase of the three-phase current outputted from the low-pass filter operation unit by the first comparison operation unit. The OPHL detection logic unit is connected to the first comparison operation unit to receive the three-phase voltage command and receive a comparative result outputted from the first comparison operation unit. Hence, the OPHL detection logic unit is provided to determine whether the OPHL detection is executed according to the three-phase voltage command and the comparative result of the three-phase current. The accumulation operation unit is connected to the OPHL detection logic unit to calculate and accumulate abnormal times of each phase the three-phase current outputted from the OPHL detection logic unit. A corresponding zero-current counter value is accumulated when each-phase current is zero; on the contrary, the corresponding zero-current counter value is reset as zero when any phase of the three-phase current is not zero. The second comparison operation unit is connected to the accumulation operation unit, and receives an external threshold counter value to compare the each-phase zero-current counter value with the threshold counter value. The second comparison operation unit outputs a corresponding high-level value when each phase of the accumulated zero-current counter value is larger than the threshold counter value, separately. The threshold counter value is equal or greater than a ratio, and the ratio is set as a sampling frequency divided by a minimum operation frequency. The third logic operation unit is connected to the second comparison operation unit to operate the outputted value of the second comparison operation unit and output the OPHL certified value. The OPHL certified value equals logic 1 when any one phase of the outputted value of second comparison operation unit is the high-level value, and the OPHL certified value equals logic 0 when three phases of the outputted value of second comparison operation unit are low-level values.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
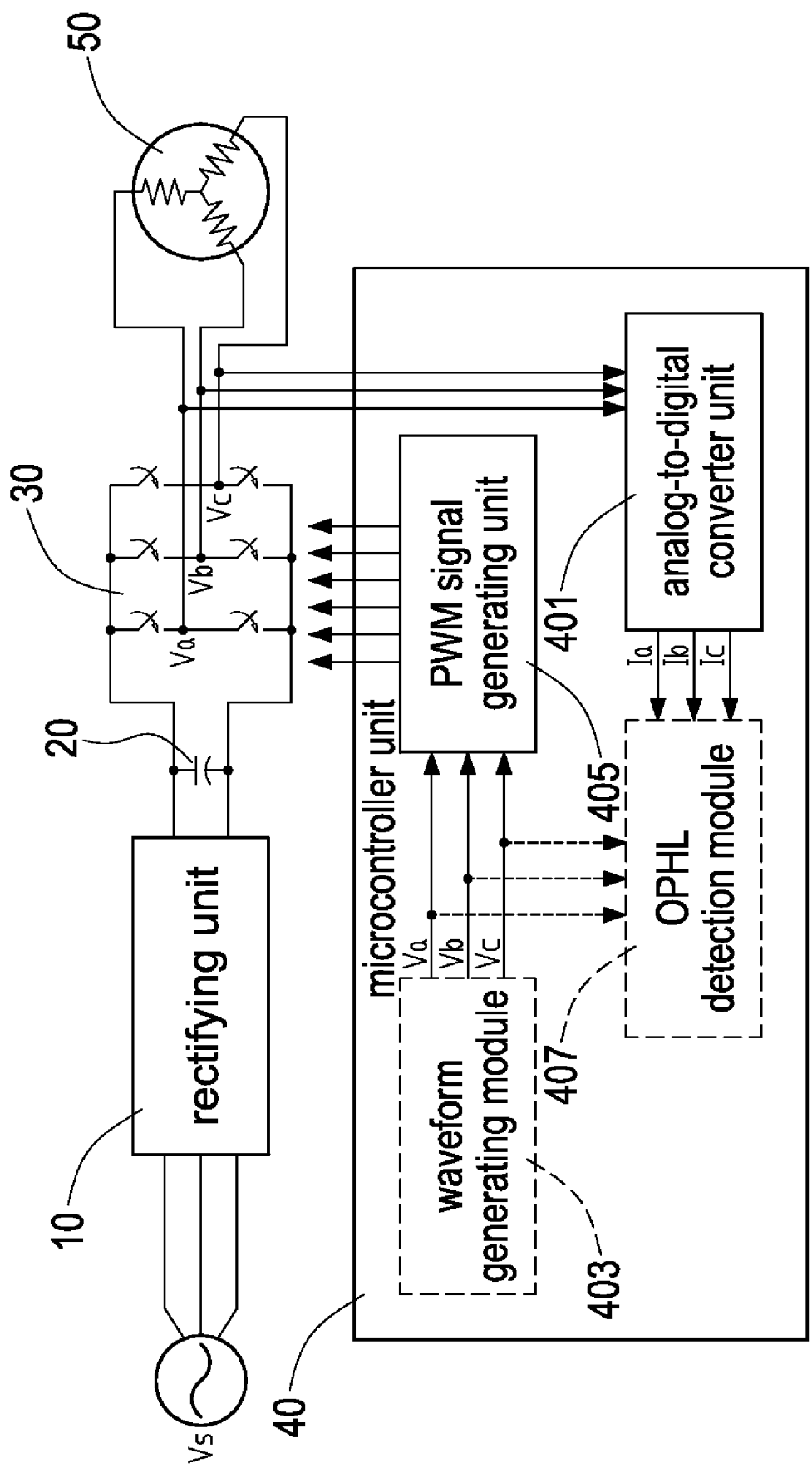
FIG. 1 is a block diagram of an output phase loss (OPHL) detection apparatus for a motor driver according to the present invention.

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Reference will now be made to the drawing figures to describe the present invention in detail.

Reference is made to FIG. 1 which is a block diagram of an output phase loss (OPHL) detection apparatus for a motor driver according to the present invention. The OPHL detection apparatus comprises a rectifying unit 10, a filtering unit 20, a converting unit 30, a microcontroller unit 40, and a motor 50. The rectifying unit 10 is electrically connected to an external three-phase A.C. power Vs, and the A.C. power Vs is converted into a D.C. power by the rectifying unit 10. The filtering unit 20 is electrically connected to the rectifying unit 10 to stabilize the D.C. power. The converting unit 30 is electrically connected to the filtering unit 20 to convert the D.C. power into an adjustable three-phase A.C. power. The microcontroller unit 40 includes an analog-to-digital converter unit 401, a waveform generating module 403, a PWM signal generating unit 405, and an OPHL detection module 407. The waveform generating module 403 and the OPHL detection module 407 are implemented via firmware. The analog-to-digital converter unit 401 reads a three-phase current outputted from the converting unit 30, and converts the analog three-phase current into a digital three-phase current to the OPHL detection module 407. The waveform generating module 403 generates a three-phase voltage command and the three-voltage command is provided to the PWM signal generating unit 405 and the OPHL detection module 407. The PWM signal generating unit 405 controls the converting unit 30 to drive the motor 50.

Figure 2:
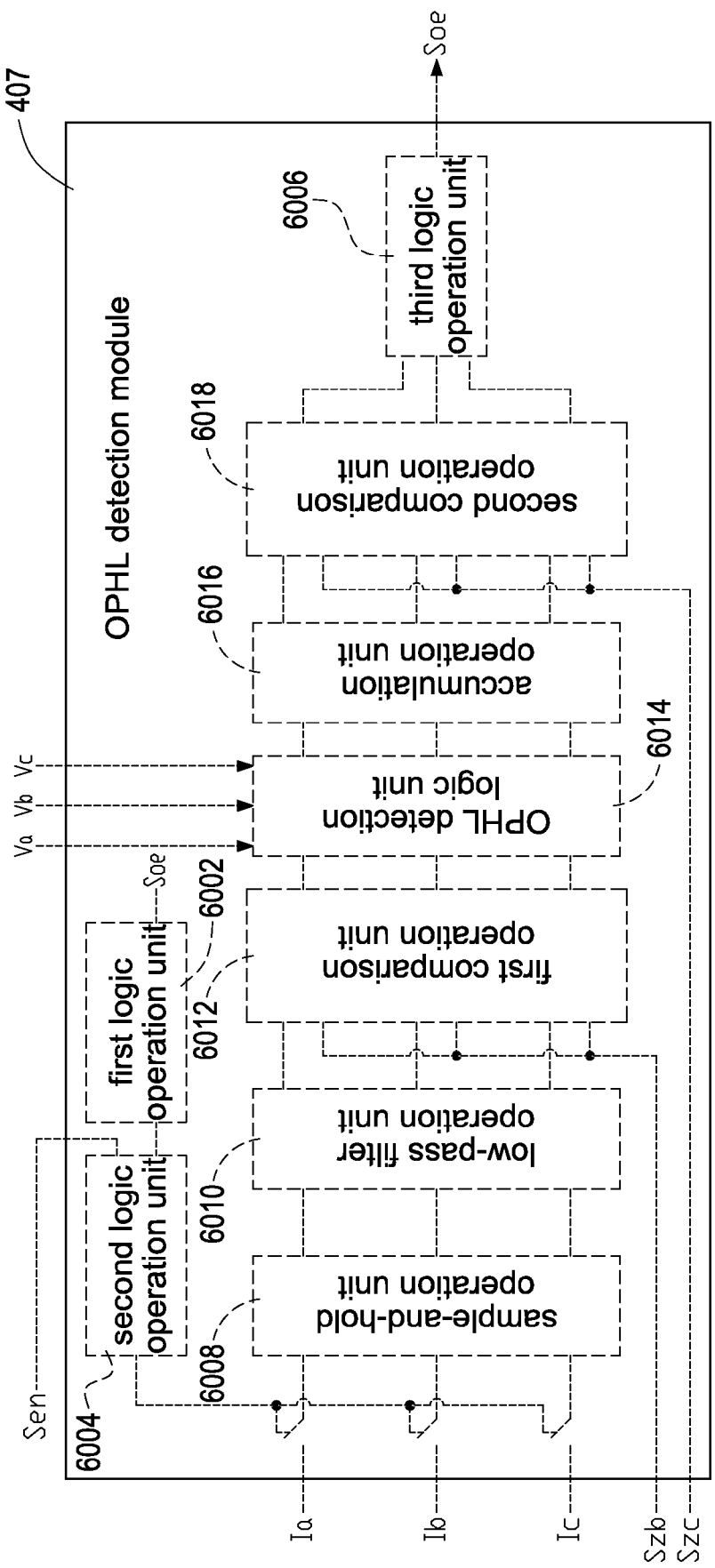
FIG. 2 is a function block diagram of an OPHL detection module.

Reference is made to FIG. 2 which is a function block diagram of an OPHL detection module. Although the function block is shown in a logic block, the logic block can be programmed by software and implemented via firmware. The OPHL detection module 407 includes a first logic operation unit 6002, a second logic operation unit 6004, a third logic operation unit 6006, a sample-and-hold operation unit 6008, a low-pass filter operation unit 6010, a first comparison operation unit 6012, an OPHL detection logic unit 6014, an accumulation operation unit 6016, and a second comparison operation unit 6018. The first logic operation unit 6002 is a "NOT" gate, the second logic operation unit 6004 is an "AND" gate, and the third logic operation unit 6010 is an "OR" gate. The first logic operation unit 6002 receives an OPHL certified value Soe, and the OPHL certified value Soe is outputted from the third logic operation unit 6006. The second logic operation unit 6004 receives an external enable bit Sen. The external enable bit Sen and an output of the first logic operation unit 6002 are the inputs of the second logic operation unit 6004, and a control bit Sc is produced by the second logic operation unit 6004. The sample-and-hold operation unit 6008 receives the digital three-phase current (Ia, Ib, and Ic) from the analog-to-digital converter unit 401 and the control bit Sc is provided to control whether the sample-and-hold operation unit 6008 connects the digital three-phase current (Ia, Ib, and Ic) or not.

The sample-and-hold operation unit 6008 receives the digital three-phase current and the three-phase current is sampled and held by the sample-and-hold operation unit 6008 when the control bit Sc equals logic 1. The sample-and-hold operation unit 6008 can not receive the three-phase current when the control bit Sc equals logic 0. The low-pass filter operation unit 6010 is connected to the sample-and-hold operation unit 600 to filter high-frequency component of each phase of the sampled three-phase current. The first comparison operation unit 6012 is connected to the low-pass filter operation unit 6010 and receives a zero-current threshold value Szb. The zero-current threshold value Szb is compared with each phase of the three-phase current outputted from the low-pass filter operation unit 6010 by the first comparison operation unit 6012. The corresponding phase current is zero when each phase of the three-phase current is smaller than the zero-current threshold value Szb. On the contrary, the corresponding phase current is not zero when each phase of the three-phase current is equal or greater than the zero-current threshold value Szb. The OPHL detection logic unit 6014 is connected to the first comparison operation unit 6012 to receive the three-phase voltage command and receive a comparative result outputted from the first comparison operation unit 6012. Hence, the OPHL detection logic unit 6014 is provided to determine whether the OPHL detection is executed according to the three-phase voltage command and the comparative result of the three-phase current. Two conditions are regarded as the abnormal OPHL operation:

1. A single-phase OPHL is detected when any one phase of the three-phase current is zero and other two phases are not zero.
2. A multi-phase OPHL is detected when three phases of the three-phase current are zero and any one phase of the three-voltage command is not zero.

The accumulation operation unit 6016 is connected to the OPHL detection logic unit 6014 to calculate and accumulate abnormal times of each phase the three-phase current outputted from the OPHL detection logic unit 6014. A corresponding zero-current counter value is accumulated when each-phase current is zero. On the contrary, the corresponding zero-current counter value is reset as zero when any phase of the three-phase current is not zero. The second comparison operation unit 6018 is connected to the accumulation operation unit 6016, and receives an external threshold counter value Szc to compare the each-phase zero-current counter value with the threshold counter value Szc. The second comparison operation unit 6018 outputs a corresponding high-level value when each phase of the accumulated zero-current counter value is larger than the threshold counter value Szc, separately. The threshold counter value Szc is equal or greater than a ratio, and the ratio is set as a sampling frequency divided by a minimum operation frequency. The third logic operation unit 6006 is connected to the second comparison operation unit 6018 to operate the outputted value of the second comparison operation unit 6018 and output the OPHL certified value Soe. The OPHL certified value Soe equals logic 1 when any one phase of the outputted value of second comparison operation unit 6018 is the high-level value, and the OPHL certified value Soe equals logic 0 when three phases of the outputted value of second comparison operation unit 6018 are low-level values.

Figure 3:
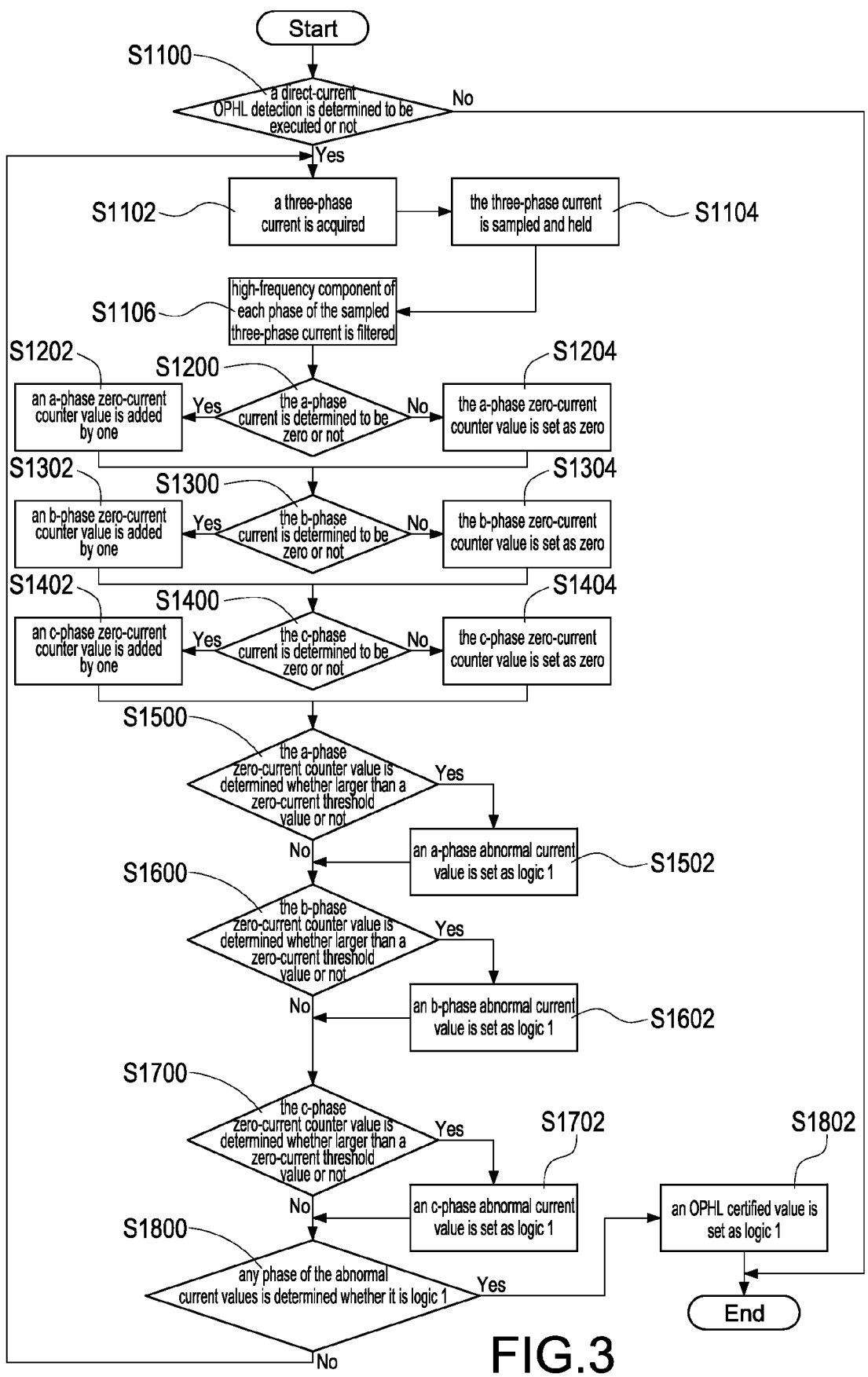
FIG. 3 is a flowchart of a direct-current OPHL detection.

Reference is made to FIG. 3 which is a flowchart of a direct-current OPHL detection. First, the direct-current OPHL detection is determined to be executed or not before the motor driver is operated (S1100). Each phase of a three-phase current outputted from a converting unit is acquired when the direct-current OPHL detection is executed (S1102); the direct-current OPHL detection is finished when the direct-current OPHL detection is not executed. The three-phase current is converted into a direct-current three-phase current by an analog-to-digital converter unit. The direct-current three-phase current is sampled and held by a sample-and-hold operation unit (S1104); afterward, high-frequency component of each phase of the sampled three-phase current is filtered by a low-pass filter operation unit (S1106). The filtered three-phase current is provided to execute the direct-current OPHL detection by an OPHL detection logic unit.

The a-phase current is determined to be zero or not (S1200). An a-phase zero-current counter value is added by one when the a-phase current is zero (S1202); the a-phase zero-current counter value is set as zero when the a-phase current is not zero (S1204). The b-phase current is determined whether zero or not (S1300). A b-phase zero-current counter value is added by one when the b-phase current is zero (S1302); the b-phase zero-current counter value is set as zero when the b-phase current is not zero (S1304). The c-phase current is determined whether zero or not (S1400). A c-phase zero-current counter value is added by one when the c-phase current is zero (S1402); the c-phase zero-current counter value is set as zero when the c-phase current is not zero (S1404). Afterward, the a-phase zero-current counter value is determined whether larger than a zero-current threshold value or not (S1500). An a-phase abnormal current value is set as logic 1 when the a-phase zero-current counter value is larger than the zero-current threshold value (S1502). The b-phase zero-current counter value is determined to be larger than the zero-current threshold value or not when the a-phase zero-current counter value is not larger than the zero-current threshold value (S1600). A b-phase abnormal current value is set as logic 1 when the b-phase zero-current counter value is larger than the zero-current threshold value (S1602). The c-phase zero-current counter value is determined to be larger than the zero-current threshold value or not when the b-phase zero-current counter value is not larger than the zero-current threshold value (S1700). A c-phase abnormal current value is set as logic 1 when the c-phase zero-current counter value is larger than the zero-current threshold value (S1702). Any phase of the abnormal current values is determined whether it is logic 1 when the c-phase zero-current counter value is not larger than the zero-current threshold value (S1800). An OPHL certified value is set as logic 1 and the abnormal direct-current OPHL operation is confirmed when any phase of the abnormal current values equals logic 1 (S1802). The procedure returns to the step (S1102) when all the abnormal current values are logic 0.

Figure 4:
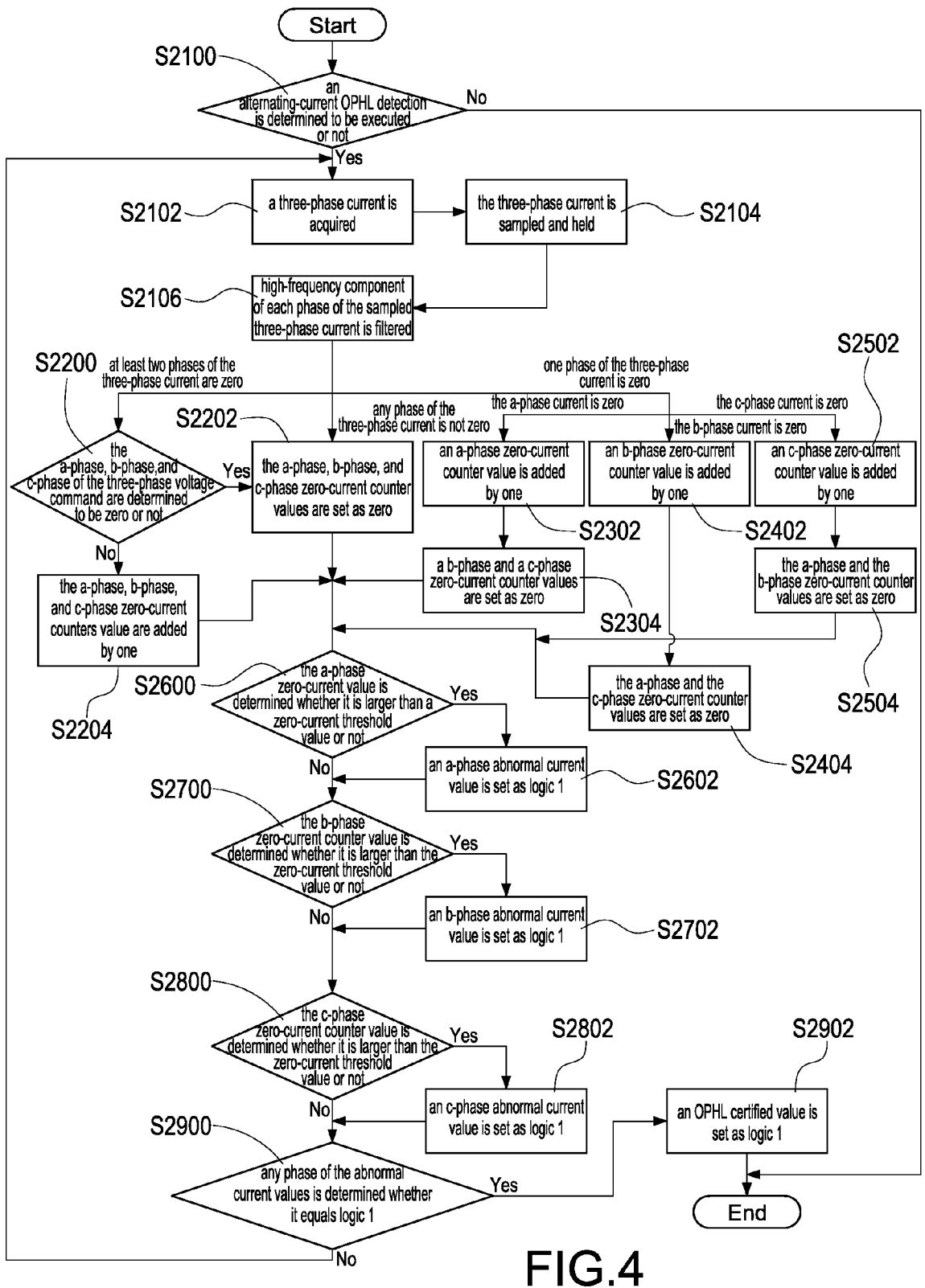
FIG. 4 is a flowchart of an alternating-current OPHL detection.

Reference is made to FIG. 4 is a flowchart of an alternating-current OPHL detection. First, the alternating-current OPHL detection is determined to be executed or not after the motor driver is operated (S2100). Each phase of a three-phase current outputted from the converting unit is acquired when the alternating-current OPHL detection is executed (S2102); the alternating-current OPHL detection is finished when the alternating-current OPHL detection is not executed. The three-phase current is converted into a direct-current three-phase current by the analog-to-digital converter unit. The direct-current three-phase current is sampled and held by the sample-and-hold operation unit (S2104), afterward, high-frequency component of each phase of the sampled three-phase current is filtered by the low-pass filter operation unit (S2106). The filtered three-phase current is provided to execute the alternating-current OPHL detection by the OPHL detection logic unit, and two conditions are determined as following:

1. One of the a-phase, b-phase, or c-phase current is zero. For example, an a-phase zero-current counter value is added by one (S2302) and a b-phase and a c-phase zero-current counter values are set as zero (S2304) when the a-phase current is zero. The b-phase zero-current counter value is added by one (S2402) and the a-phase and the c-phase zero-current counter values are set as zero (S2404) when the b-phase current is zero. The c-phase zero-current counter value is added by one (S2502) and the a-phase and the b-phase zero-current counter values are set as zero (S2504) when the c-phase current is zero. The a-phase, b-phase, and c-phase zero-current counter values are set as zero when the a-phase, b-phase, and c-phase currents are not zero (S2202).

2. The a-phase, b-phase, and c-phase of the three-phase voltage command are determined to be zero or not when at least two phases of the three-phase current are zero (S2200). The procedure returns to the step (S2202) when all phases of the three-phase voltage command are zero. The a-phase, b-phase, and c-phase zero-current counters value are added by one when all phases of the three-phase voltage command are not zero (S2204).

The a-phase zero-current value is determined whether it is larger than a zero-current threshold value or not (S2600) when the two conditions are satisfied. An a-phase abnormal current value is set as logic 1 when the a-phase zero-current counter value is larger than the zero-current threshold value (S2602). The b-phase zero-current counter value is determined whether it is larger than the zero-current threshold value or not when the a-phase zero-current counter value is not larger than the zero-current threshold value (S2700). A b-phase abnormal current value is set as logic 1 when the b-phase zero-current counter value is larger than the zero-current threshold value (S2702). The c-phase zero-current counter value is determined whether it is larger than the zero-current threshold value or not when the b-phase zero-current counter value is not larger than the zero-current threshold value (S2800). A c-phase abnormal current value is set as logic 1 when the c-phase zero-current counter value is larger than the zero-current threshold value (S2802). Any phase of the abnormal current values is determined whether it equals logic 1 when the c-phase zero-current counter value is not larger than the zero-current threshold value (S2900). An OPHL certified value is set as logic 1 and the abnormal alternating-current OPHL operation is confirmed when any phase of the abnormal current values equals logic 1 (S2902). The procedure returns to the step (S2102) when all the abnormal current values equal logic 0.

In conclusion, the method of manufacturing high power light emitting device packages and architecture of the present invention has the following advantages:

1. The OPHL detection can be executed without an accurate current control mechanism.

2. The single-phase detection and the multi-phase OPHL detection can be implemented.

3. The direct-current OPHL detection and the alternating-current OPHL detection can be executed before the motor driver operated and after the motor driver operated, separately.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of detecting an output phase loss (OPHL) for a motor driver, the method applied to detect a direct-current OPHL before the motor driver operates, the method comprising the steps of:
    (a) determining whether a direct-current OPHL detection is executed or not;

(b) acquiring and sampling each phase of a three-phase current when the direct-current OPHL detection is executed;

(c) filtering high-frequency component of each phase of the three-phase current;

(d) determining whether each phase of the three-phase current is zero or not;

(e) determining whether any zero-phase current of the three-phase current is continually zero or not;

(f) confirming the motor driver operated in the direct-current OPHL when any zero-phase current is continually zero.

2. The method of detecting the OPHL in claim 1, in the step (d), a corresponding zero-current counter value is added by one when any phase of the three-phase current is zero.

3. The method of detecting the OPHL in claim 1, in the step (d), a corresponding zero-current counter value is reset as zero when any phase of the three-phase current is not zero.

4. The method of detecting the OPHL in claim 1, in the step (e), the zero-phase current of the three-phase current is zero when the zero-current counter value is larger than a corresponding threshold counter value.

5. The method of detecting the OPHL in claim 4, a corresponding abnormal current value is set as one when the zero-phase current of the three-phase current is continually zero.

6. The method of detecting the OPHL in claim 5, in the step (f), an OPHL certified value is set as one when any phase of the abnormal current value is one to confirm that the motor driver is operated in the direct-current OPHL.

7. The method of detecting the OPHL in claim 4, wherein the threshold counter value is equal to or greater than a ratio, and the ratio is equal to a sampling frequency divided by a minimum operation frequency.

8. A method of detecting an output phase loss (OPHL) for a motor driver, the method applied to detect an alternating-current OPHL after the motor driver operates, the method comprising the steps of:

(a) determining whether an alternating-current OPHL detection is executed or not;

(b) acquiring and sampling each phase of a three-phase current when the alternating-current OPHL detection is executed;

(c) filtering high-frequency component of each phase of the three-phase current;

(d) determining whether each phase of the three-phase current is zero or not;

(e) determining whether any zero-phase current of the three-phase current is continually zero or not;

(f) confirming the motor driver operated in the alternating-current OPHL when any zero-phase current is continually zero.

9. The method of detecting the OPHL in claim 8, in the step (d), a corresponding zero-current counter value is added by one when any phase of the three-phase current is zero; or the corresponding zero-current counter value is reset as zero when any phase of the three-phase current is not zero.

10. The method of detecting the OPHL in claim 9, wherein the three-phase zero-current counter values are added by one when at least two phases of the three-phase current are zero and the all three-phase voltage commands are not zero.

11. The method of detecting the OPHL in claim 9, wherein the three-phase zero-current counter values are set as zero when at least two phases of the three-phase current are zero and the all three-phase voltage commands are zero.

12. The method of detecting the OPHL in claim 8, in the step (e), the zero-phase current of the three-phase current is zero when the zero-current counter value is larger than a corresponding threshold counter value.

13. The method of detecting the OPHL in claim 12, a corresponding abnormal current value is set as one when the zero-phase current of the three-phase current is continually zero.

14. The method of detecting the OPHL in claim 13, in the step (f), an OPHL certified value is set as one when any phase of the abnormal current value equals logic 1 to confirm that the motor driver is operated in the alternating-current OPHL.

15. The method of detecting the OPHL in claim 12, wherein the threshold counter value is equal to or greater than a ratio, and the ratio is equal to a sampling frequency divided by a minimum operation frequency.

* * * * *